United States Patent [19]

Morita

[11] Patent Number: 5,784,986
[45] Date of Patent: Jul. 28, 1998

[54] SEWING DATA PROCESSING DEVICE

[75] Inventor: Nami Morita, Nagoya, Japan

[73] Assignee: Brother Kogyo Kabushiki Kaisha, Nagoya, Japan

[21] Appl. No.: 766,764

[22] Filed: Dec. 13, 1996

[30] Foreign Application Priority Data

Dec. 15, 1995 [JP] Japan ................... 7-327528

[51] Int. Cl.$^6$ .................. D05B 21/00; D05C 5/02
[52] U.S. Cl. .................. 112/102.5; 112/445; 112/475.19
[58] Field of Search ................. 112/102.5, 103, 112/470.06, 445, 456, 458, 475.19

[56] References Cited

U.S. PATENT DOCUMENTS

| | | | |
|---|---|---|---|
| 4,548,142 | 10/1985 | Peck | 112/102.5 |
| 4,960,061 | 10/1990 | Tajima et al. | 112/445 X |
| 5,427,044 | 6/1995 | Hirabayashi | 112/445 X |
| 5,553,559 | 9/1996 | Inoue et al. | 112/102.5 |
| 5,648,908 | 7/1997 | Chim et al. | 112/470.06 X |

*Primary Examiner*—Peter Nerbun
*Attorney, Agent, or Firm*—Oliff & Berridge, PLC

[57] ABSTRACT

A plurality of embroidery patterns are displayed based on a plurality of embroidery pattern data. A user selects one of the displayed embroidery patterns. The selected embroidery pattern is located at the user's desired position. Next, based on frame date, it is judged which of several frames is usable with respect to the selected embroidery pattern located at the desired position. The screen displays only a frame determined as usable for the selected embroidery pattern at the desired position.

25 Claims, 7 Drawing Sheets

SEWING DATA PROCESSING DEVICE

BACKGROUND OF THE INVENTION

1. Field of the Invention

The present invention relates to a sewing data processing device for processing sewing data for producing sewing patterns.

2. Description of the Related Art

In a conventional sewing machine, a work fabric to be sewn is supported by a rectangular-shaped frame. The frame is moved horizontally. A stitching needle is moved vertically, i.e., upwardly and downwardly, at a fixed horizontal position relative to the work fabric. A maximum size of a frame, that can be combined with the sewing machine, and a maximum range, in which the frame can be moved horizontally, are determined dependent on: a distance between the stitching needle and a column portion provided to the sewing machine; and an operability of the mechanism to move the frame horizontally. The sewing machine allows a user to select a great variety of embroidery patterns, such as small letter patterns and large animal character patterns. If the sewing machine is mounted with a frame with its sewing range being smaller than an embroidery pattern desired to be sewn, the stitching needle will collide against the frame and will be broken. In view of this, the sewing machine has a memory for previously storing therein data of sewing ranges of several frames prepared to be combined with the sewing machine. An operator first selects a frame desired to be used. Then, the operator selects an embroidery pattern desired to be sewn on a work fabric. The sewing machine then judges whether or not the selected embroidery pattern can fit within the selected frame.

SUMMARY OF THE INVENTION

In the above-described sewing machine, the operator selects a frame before selecting his/her desired embroidery pattern. It is therefore difficult to freely select the frame. When the selected frame is determined inappropriate for the selected embroidery pattern, the operator may possibly give up producing his/her desired embroidery pattern because the operator cannot know whether other frames are appropriate for that embroidery pattern.

There is another problem when the operator selects a frame having a sewing range too wide to sew his/her selected embroidery pattern. The work fabric may be too small relative to the frame, and therefore may not be supported by the frame. Even though the work fabric can be attached to the frame, the work fabric will be too loose when supported. by the too large frame.

It is therefore, an object of the present invention to overcome the above-described drawbacks, and to provide an improved sewing data processing device.

In order to attain the above and other objects, the present invention provides a sewing data processing device, comprising: sewing pattern display means for displaying a plurality of sewing patterns based on a plurality of sets of sewing pattern data indicative of shapes of the plurality of sewing patterns; sewing pattern selection means for selecting at least one of the plurality of sewing patterns displayed by the sewing pattern display means; positioning means for positioning the selected sewing pattern at a desired position; judging means for judging at least one of an embroidery frame usable for the selected sewing pattern positioned at the desired position and another embroidery frame unusable for the selected sewing pattern positioned on the desired position, the judging means judging the embroidery frame based on embroidery frame data; and output means for outputting the judged result.

The judging means may judge an embroidery frame usable for the selected sewing pattern positioned at the desired position, the output means including usable frame display means for displaying only the judged usable embroidery frame.

The sewing data processing device may further comprise frame display means for displaying several embroidery frames based on several sets of embroidery frame data. The judging means may judge an embroidery frame unusable for the selected sewing pattern positioned at the desired position, and the output means may include display control means for controlling the frame display means to erase the unusable embroidery frame. The judging means may judge both an embroidery frame usable for the selected sewing pattern positioned at the desired position and another embroidery frame unusable for the selected sewing pattern positioned at the desired position, and the output means may include indication means for indicating both the usable embroidery frame and the unusable embroidery frame. The judging means may judge an embroidery frame unusable for the selected sewing pattern positioned at the desired position, and the output means may include frame selection prohibiting means for prohibiting an operator from selecting the unusable embroidery frame.

According to another aspect, the present invention provides a sewing data processing device, comprising: a sewing pattern display displaying a plurality of sewing patterns based on a plurality of sets of sewing pattern data indicative of shapes of the plurality of sewing patterns; a sewing pattern selection unit selecting at least one of the plurality of sewing patterns displayed by the sewing pattern display unit; a positioning unit positioning the selected sewing pattern at a desired position; a judging unit judging at least one of an embroidery frame usable for the selected sewing pattern positioned at the desired position and another embroidery frame unusable for the selected sewing pattern positioned at the desired position, the judging unit judging the embroidery frame based on embroidery frame data; and an output unit outputting the judged result.

According to a further aspect, the present invention provides a method of processing sewing data, the method comprising the steps of: displaying a plurality of sewing patterns based on a plurality of sets of sewing pattern data indicative of shapes of the plurality of sewing patterns; selecting at least one of the displayed plurality of sewing patterns; positioning the selected sewing pattern at a desired position; judging at least one of an embroidery frame usable for the selected sewing pattern positioned at the desired position and another embroidery frame unusable for the selected sewing pattern positioned at the desired position, the judgement being performed based on embroidery frame data; and outputting the judged result.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
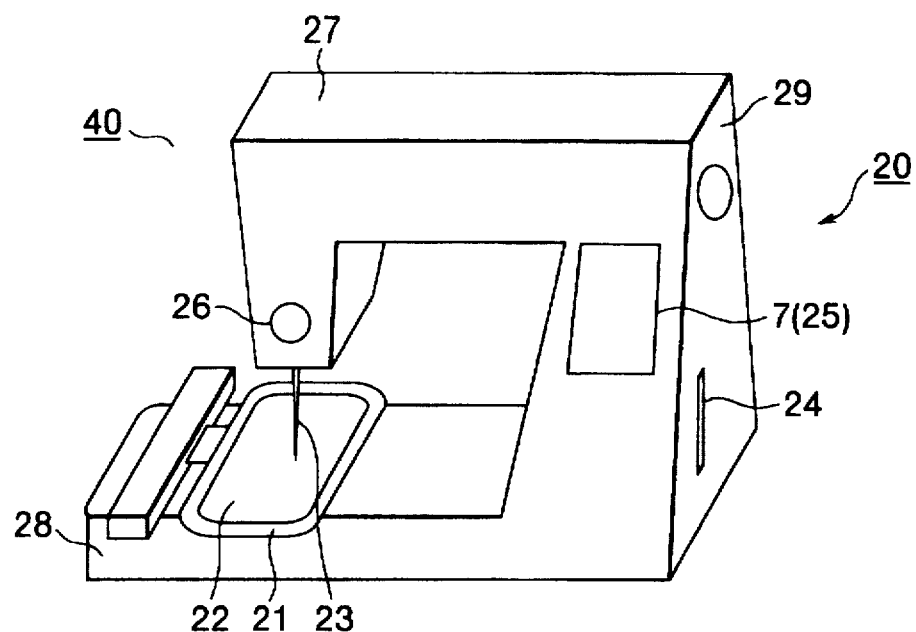
FIG. 1 is an external perspective view of a home embroidery sewing machine according to an embodiment of the present invention.

A sewing data processing device according to a preferred embodiment of the present invention will be described while referring to the accompanying drawings wherein like parts and components are designated by the same reference numerals.

This embodiment provides a home embroidery machine to which the sewing data processing device of the present invention is applied.

The overall structure of the home embroidery machine will be described with reference to FIG. 1.

The home embroidery machine 20 is for producing an operator's desired embroidery data and then sewing the operator's desired embroidery on a work fabric 22 based on the embroidery data.

Figure 2:
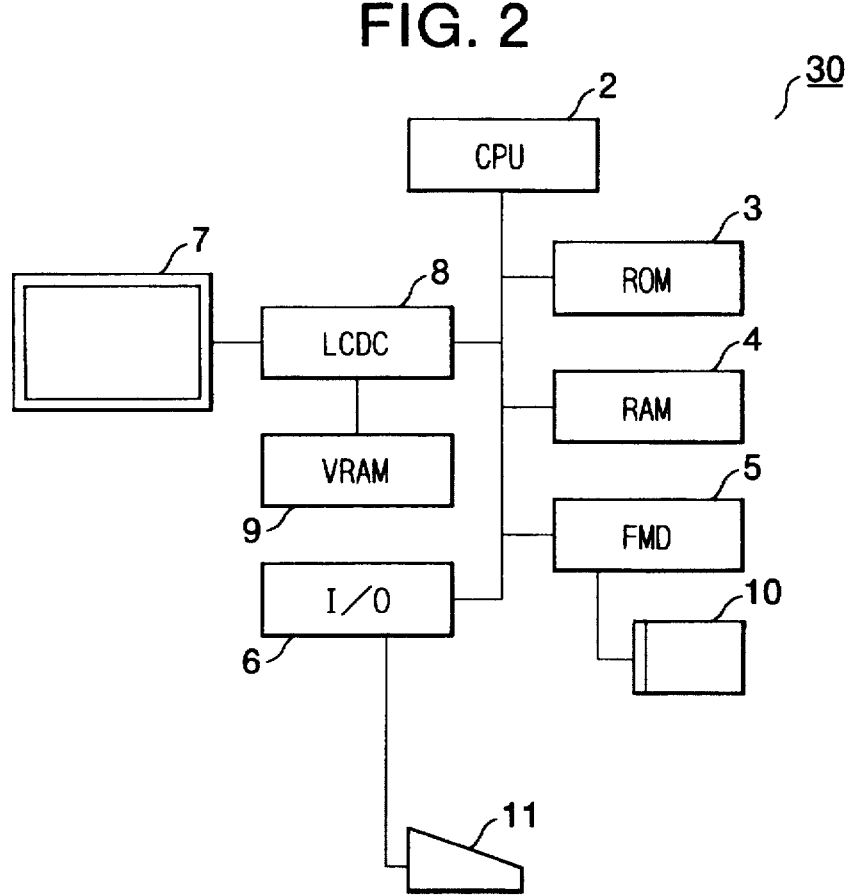
FIG. 2 is a block diagram showing an internal structure of a control portion (embroidery data processing circuit) employed in the sewing machine of FIG. 1.

The home embroidery machine 20 is comprised of a control portion 30 shown in FIG. 2 and a sewing portion 40 shown in FIG. 1. The sewing portion 40 is for sewing embroideries on a work fabric 22 based on embroidery data. The sewing portion 40 has a head portion 27, a bed portion 28, and a column portion 29.

The head portion 27 is provided with a stitching needle 23 which is controlled to move vertically relative to the bed portion 28. As shown in FIG. 1, a sewing start key 26 is mounted to the head portion 27.

The home embroidery machine 20 can be operated with a plurality of embroidery frames 21 each for supporting a work fabric 22 desired to be sewn with embroideries. In this example, three embroidery frames 21 (110, 111, and 112) can be combined with the home embroidery machine 20. As will be described later with reference to FIG. 8, the embroidery frames 110, 111, and 112 have different sizes and different shapes. The largest embroidery frame 110 has a rectangular shape and has a length of 20 cm and a width of 10 cm. The middle-sized embroidery frame 111 has a square shape and has a side of 10 cm. The smallest embroidery frame 112 has a circular shape and has a diameter of 3 cm.

The home embroidery machine 20 is combined with one embroidery frame 21 (either one of the three frames 110–112) at a time. The home embroidery machine 20 is provided with a horizontal movement mechanism (not shown) for moving the embroidery frame 21 horizontally along the bed portion 28. The horizontal movement mechanism moves the embroidery frame 21 to the operator's desired positions indicated by an X-Y coordinate system determined on the bed portion 28. With this structure, when the embroidery frame 21 moves the work fabric 22 in the horizontal direction, the stitching needle 23 moves vertically relative to the embroidery frame 21, thereby sewing the work fabric 22 with the operator's desired embroidery patterns.

It is noted that a maximum sewable range 103 is defined as a region, within which the stitching needle 23 can sew embroideries. The maximum sewable range 103 is defined on the X-Y coordinate system along the bed portion 28. The maximum sewable range 103 is determined as a range in which the horizontal moving mechanism can move the largest embroidery frame 110 along the bed portion 28.

The column portion 29 is provided with a touch panel 25 made from a liquid crystal display 7. The touch panel 25 displays various screens shown in FIGS. 5–11 as will be described later. The column portion 29 is also formed with a flash memory insertion slot 24 for receiving a flash memory 10 therein.

The control portion 30 is for producing embroidery data indicative of the operator's desired embroidery, recording the embroidery data in the flash memory 10, and controlling the horizontal movement mechanism based on the embroidery data to horizontally move the embroidery frame 21 while actuating the stitching needle 23 vertically, thereby sewing the operator's desired embroidery on the work fabric 22.

As shown in FIG. 2, the control portion 30 is constructed from a microcomputer. The control portion 30 includes: a CPU 2, a ROM 3, a RAM 4, a flash memory device 5 for retrieving embroidery data from and recording embroidery data into the flash memory 10, a liquid crystal display controller (LCDC) 8, and an input/output interface 6, which are connected with each other via a bus line. The interface 6 is for receiving input data from an input portion 11. The LCDC a is connected with an image storage device (VRAM) 9 and the liquid crystal display (LCD) 7.

The flash memory device 5 includes: the flash memory insertion slot 24 for receiving a flash memory 10; and a data retrieving/recording unit for retrieving embroidery data from and recording embroidery data into the flash memory 10 inserted in the insertion slot 24.

The flash memory 10 previously stores therein a plurality of sets of embroidery data indicative of a plurality of embroidery patterns which can be produced by the home embroidery machine 20. Each set of embroidery data includes coordinate data indicative of needle locations in the predetermined X-Y coordinate system for sewing a corresponding embroidery. With this structure, when the flash memory 10 is inserted by the operator into the flash memory insertion slot 24, the stored embroidery data is read out by the flash memory device 5.

The ROM 3 previously stores therein a plurality of sets of embroidery data indicative of a plurality of other embroidery patterns which can also be produced by the home embroidery machine 20. Each set of the embroidery data includes coordinate data indicative of needle locations in the predetermined X-Y coordinate system for sewing a corresponding embroidery. As will be described later, the embroidery data will be used not only for sewing embroidery patterns on the work fabric 22 but also for displaying pattern cursors 104, indicative of maximum outward forms of the embroidery patterns, on a layout screen (FIG. 8) on the touch panel 25.

The ROM 3 also stores therein several sets of processing program data such as an embroidery processing program and a frame judging process program as will be described later. The ROM 3 further stores therein several sets of image data indicative of all the embroidery frames 21 (the frames 110–112 in this example) which can be combined with the home embroidery machine 20. The ROM 3 also stores therein data F1W, F1H, F2W, F2H, F3W, and F3H indicative of the sizes of the sewable regions of the frames 112–110. The sewable region of each embroidery frame is defined as a region within the embroidery frame. The ROM 3 further stores therein several sets of binary bit map data indicative of shapes of a plurality of embroidery patterns. The binary bit map data will be used for displaying images of embroidery patterns on a pattern selection screen of FIG. 6 and on a selected pattern screen of FIG. 7 as will be described later. The ROM 3 also stores therein other various sets of bit map data necessary for producing the screens of FIGS. 5–11 which will be described later.

The LCDC 8 is for controlling the LCD 7 to display monochromatic bit map graphic screens of FIGS. 5–11 based on data which has been retrieved from the flash memory 10 or the ROM 3 and which is temporarily stored in the VRAM 9. The touch panel 25 is for displaying the thus produced screens. The operator can manipulate the touch panel 25 to control the home embroidery machine 20.

The RAM 4 is for storing embroidery data produced during an embroidery processing process as will be described later.

The input portion 11 includes the sewing start key 26 and the touch panels 25 produced on the LCD 7. The sewing start key 26 is for instructing start of a sewing operation. The touch panel 25 is for instructing selection of the operator's desired embroidery patterns and for instructing change of the selected embroidery patterns in their positions. The instructions thus inputted at the input portion 11 are transferred via the interface 6 to the CPU 2 and the RAM 4.

The CPU 2 is for controlling the entire home embroidery machine 20. For example, the CPU 2 executes the embroidery processing program for producing the operator's desired embroidery data and then sewing the operator's desired embroidery accordingly. The CPU 2 also executes the frame judging process program, as a subroutine for the embroidery processing program, to judge an embroidery frame 21 (110, 111, or 112) appropriate for sewing the operator's selected embroidery.

With the above-described structure, the home embroidery machine 20 performs the embroidery processing operation. During the embroidery processing operation, the operator edits, with using the touch panel 25, embroidery data retrieved from the flash memory 10 and/or the ROM 3, to thereby produce embroidery data indicative of the operator's desired embroidery. The control portion 30 determines frames usable for the operator's desired embroidery and displays the determined results. Observing the displayed results, the operator selects one of the usable frames, and mounts the selected frame on the bed portion 28. The control portion 30 then controls the sewing portion 40 to sew the operator's desired embroidery on the work fabric 22 based on the produced embroidery data with using the operator's set frame 21.

The home embroidery machine 20 performs the embroidery processing operation as described below.

Figure 3:
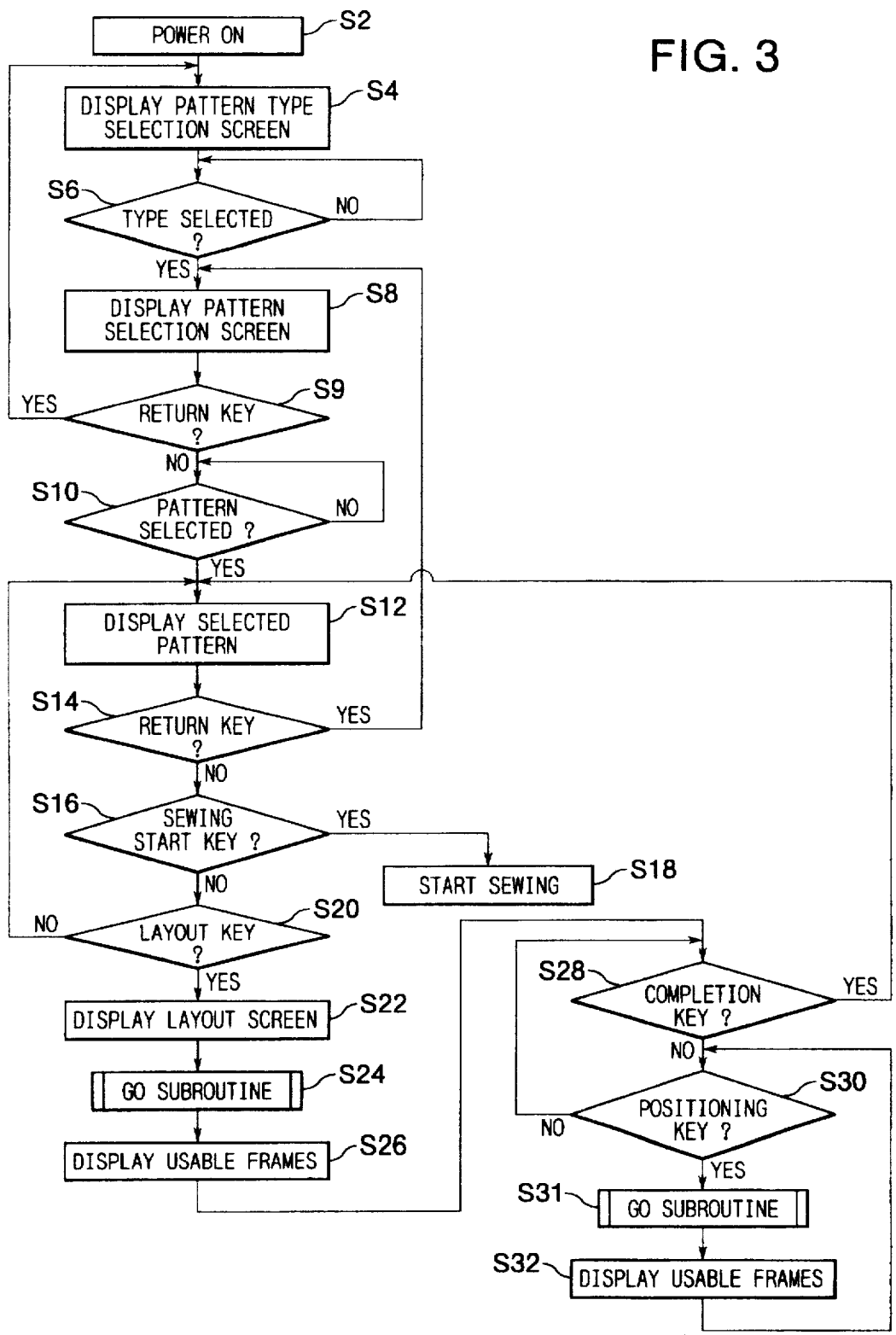
FIG. 3 is a flowchart of an embroidery sewing operation performed by the sewing machine of FIG. 1.
Figure 5:
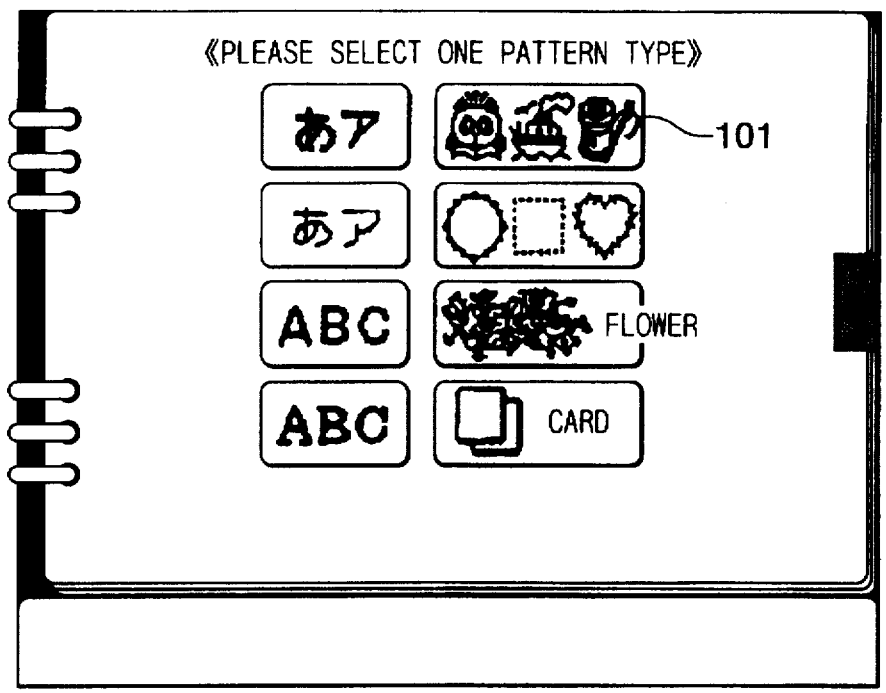
FIG. 5 shows one example of a pattern type selection screen displayed on a touch panel provided to the sewing machine of FIG. 1.

As shown in FIG. 3, when the operator first turns on the power to the embroidery machine 20 in S2, the CPU 2 controls the LCDC 8 to show a pattern type selection screen as shown in FIG. 5 on the touch panel 25 in S4.

Then, in S6, the operator selects one pattern type from among those displayed on the pattern type selection screen.

It is now assumed that the operator selects a pattern type 101 shown in FIG. 5. When the pattern type 101 is thus selected (Yes in S6), the CPU 2 further controls the LCDC 8 to show a pattern selection screen shown in FIG. 6 on s the touch panel 25 in S8. It is noted that the CPU 2 produces images of a plurality of embroidery patterns displayed on the pattern selection screen based on the bit map data retrieved from the ROM 3.

Figure 6:
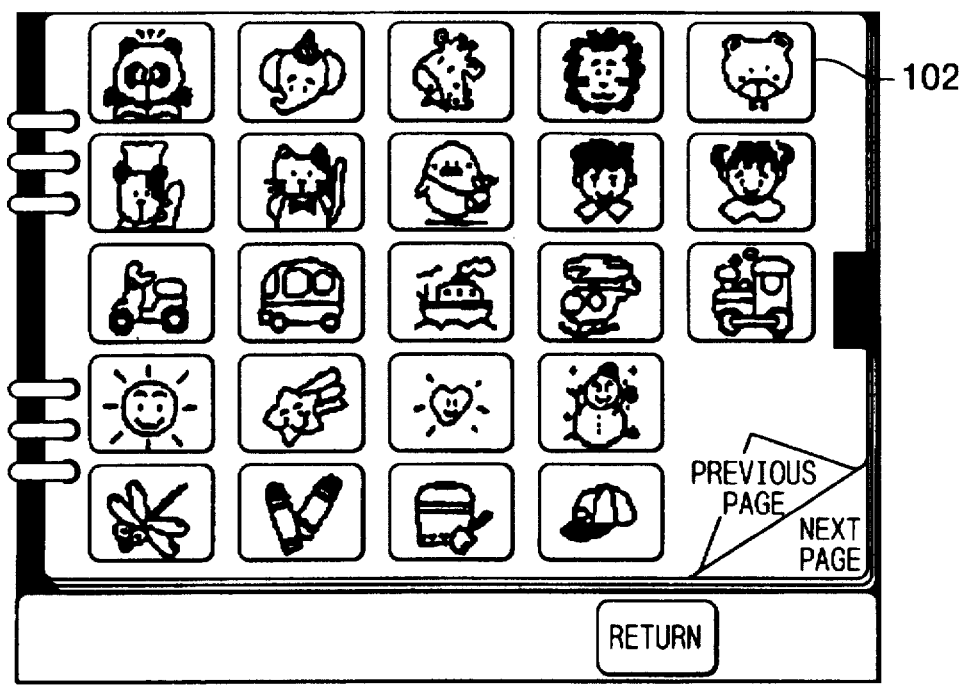
FIG. 6 shows one example of a pattern selection screen displayed on the touch panel of the sewing machine of FIG. 1.

When the operator depresses a return key on the pattern selection screen of FIG. 6 (Yes in S9), the screen goes back to the pattern type selection screen of FIG. 5, and the above-described steps S4 through S9 are repeated. Thus, another pattern type can be easily selected.

Figure 7:
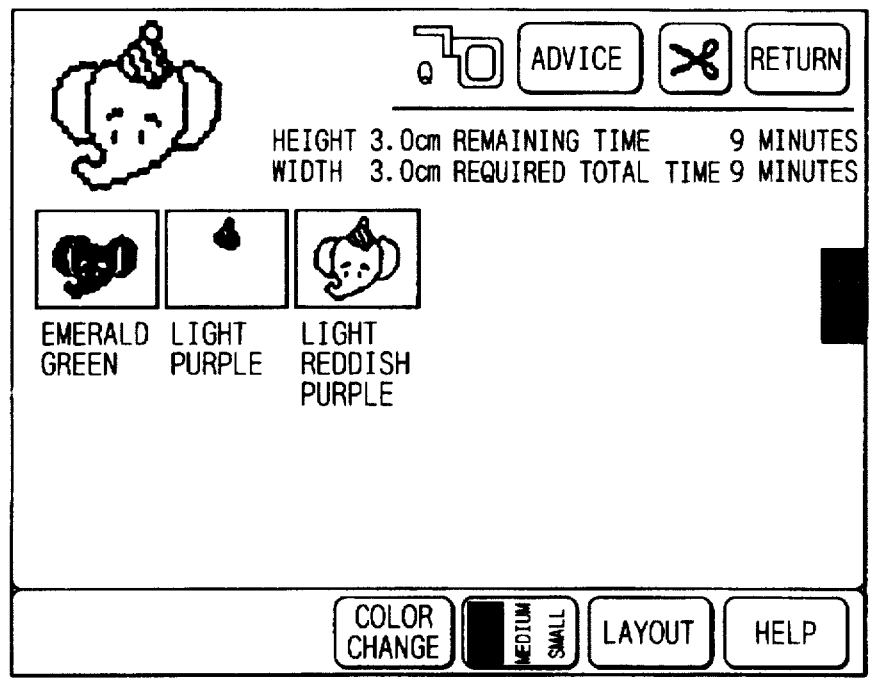
FIG. 7 shows one example of a screen showing a selected pattern displayed on the touch panel.

While the pattern selection screen of FIG. 6 is displayed, the operator can select one embroidery pattern from among the displayed patterns in S10. It is now assumed that the operator selects an embroidery pattern 102. When the embroidery pattern 102 is thus selected (Yes in S10), the CPU 2 controls in S12 the LCDC 8 to show specifications of the selected pattern on the LCD 7 as shown in FIG. 7. It is noted that the CPU 2 produces the image of the selected pattern screen of FIG. 7 also based on the bit map data retrieved from the ROM 3.

At this point, when the operator depresses a return key on the selected pattern screen (Yes in S14), the screen goes back to the pattern selection screen of FIG. 6. Then, the above-described steps S8 through S14 are repeated, thereby allowing the operator to select a plurality of patterns.

The operator can depress a layout key in the touch panel 25 (Yes in S20) while the selected pattern screen of FIG. 7 is displayed. When the operator depresses the layout key (Yes in S20), the CPU 2 controls the LCD 8 to show a layout screen shown in FIG. 8 on the touch panel 25 in S22.

Figure 8:
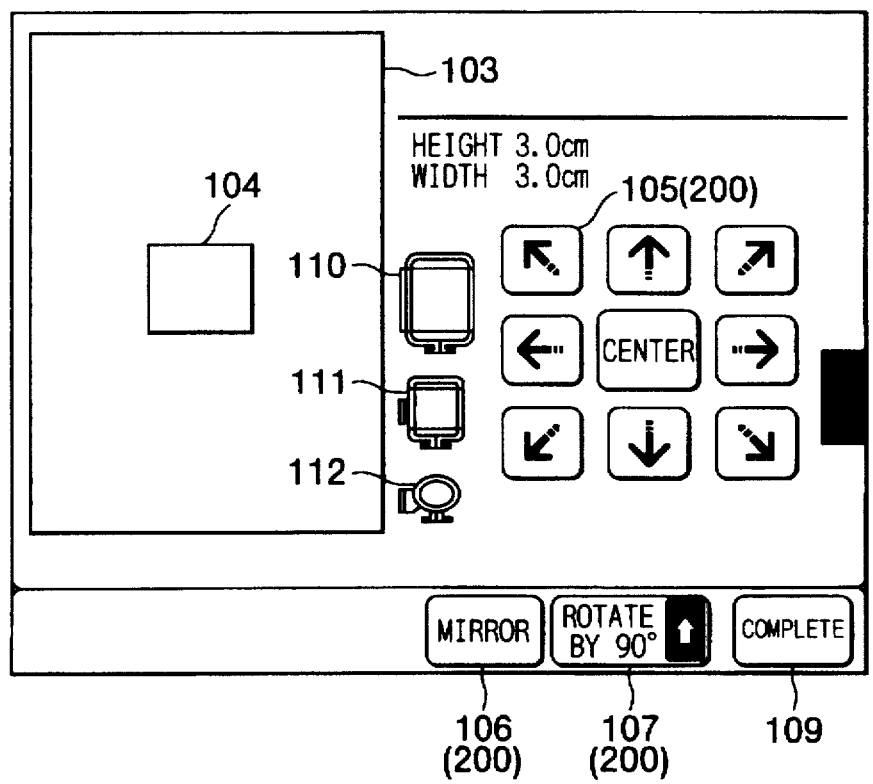
FIG. 8 shows one example of a layout screen.

As shown in FIG. 8, the layout screen displays an image of the predetermined maximum sewable range 103, within which the home embroidery machine 20 can sew embroideries with the stitching needle 23. The layout screen of FIG. 8 also displays a rectangular cursor 104 which indicates a maximum outward form of the selected embroidery pattern 102 as an approximated rectangular shape. In this example where the pattern 102 is selected, the size of the pattern cursor 104 is 3.0 cm high and 3.0 cm wide. The layout screen initially displays in S22 the pattern cursor 104 in the center position of the maximum sewable range 103. It is noted that the CPU 2 produces the rectangular cursor 104, indicative of the maximum outward form of the selected embroidery pattern 102, based on the set of embroidery data for the selected pattern 102 which is retrieved from the ROM 3 or the flash memory 10.

The layout screen also displays in S22 images of all the three embroidery frames 110 through 112 to be combined with the home embroidery machine 20. In this example, the image of the largest frame 110 is displayed as a rectangle with ten dot height and five dot width. The image of the middle-sized frame 111 is displayed as a square with four dot height and four dot width. The image of the smallest frame 112 is displayed as a circle with three dot diameter. It is noted that the CPU 2 produces the images of the frames 110–112 based on image data of the frames retrieved from the ROM 3.

The layout screen of the touch panel 25 also displays various positioning keys 200 therein. The positioning keys 200 are for moving the pattern cursor 104 within the maximum sewable range 103. The positioning keys 200 include: eight arrow keys 105; a mirror key 106; and a 90-degree rotation key 107. The arrow keys 105 are for moving the pattern cursor 104, that is, the selected embroidery pattern 102 in the arrow-indicating directions within the maximum sewable range 103. In this example, when an arrow key is depressed once, the pattern cursor 104 is moved by 0.1 mm in the arrow-indicating direction. The mirror key 106 is used for producing a mirror image of the selected embroidery pattern 102 through inverting the pattern to the left from the right. The 90-degree rotation key 107 is used for rotating the pattern cursor 104 (the selected embroidery pattern 102) by 90 degrees. It is noted that the layout screen also displays a completion key 109 for confirming completion of moving the selected pattern 102.

After thus displaying the layout screen, the CPU 2 performs in S24 an embroidery frame judging operation for determining one or more embroidery frames that can be used for the selected embroidery pattern positioned as shown in the present layout screen. This frame judging operation will be discussed later with reference to FIG. 4.

Then, in S26, the CPU 2 controls the LCDC 8 to display, on the layout screen, one or more embroidery frames that are determined as usable in S24. When the judging operation of S24 determines that all the embroidery frames 110, 111, and 112 can be used for the selected embroidery pattern 102, for example, the CPU 2 controls in S26 the LCDC 8 to show all the embroidery frames 110, 111, and 112 on the layout screen in the same manner as shown in Fig. 8.

Figure 9:
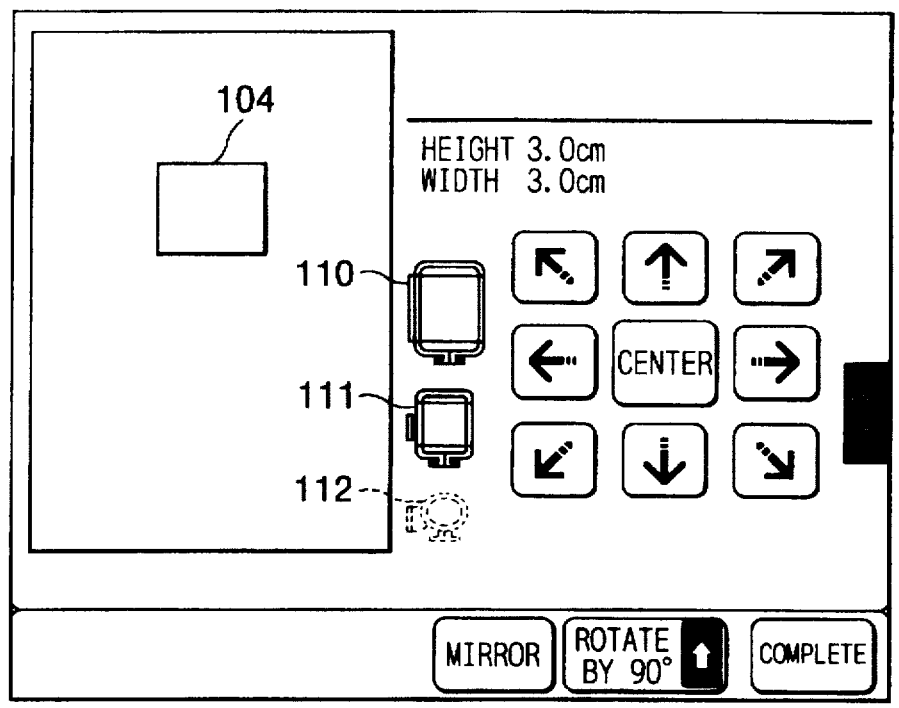
FIG. 9 shows another example of the layout screen displayed on the touch panel.
Figure 10:
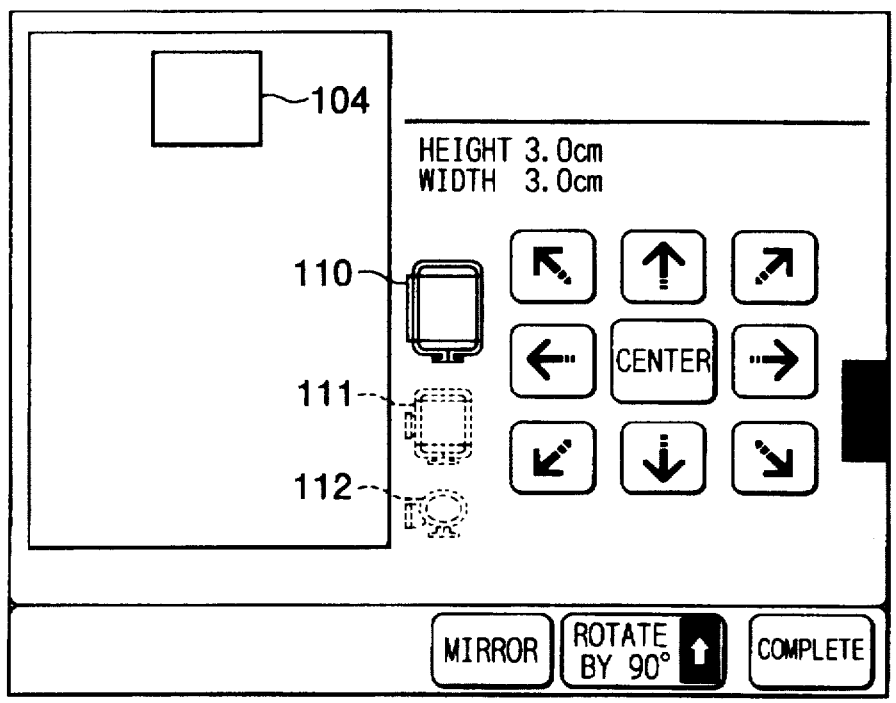
FIG. 10 shows still another example of the layout screen.

Next, the CPU 2 judges in S28 whether or not the completion key 109 has been depressed. When the completion key 109 has not yet been depressed (No in S28), the CPU 2 further judges in S30 whether or not a positioning key 200 has been depressed. That is, the CPU 2 judges whether or not either one of the keys 105, 106, and 107 has been depressed. When one positioning key 200 has been depressed and the selected pattern 102 is moved as instructed by the depressed key (Yes in S30), the CPU 2 performs in S31 a frame judging operation in the same manner as that of S24. Then, in S32, the CPU 2 controls the LCDC 8 to display one or more embroidery frames that are determined in S31 as usable with respect to the selected embroidery pattern as located in the present position. For example, when the pattern cursor 104 has been moved in S30 by a certain positioning key 200 into a position as shown in FIG. 9, the frames 110 and 111 are determined as usable. Accordingly, the frames 110 and 111 are displayed in the layout screen as shown in FIG. 9. When the pattern cursor 104 has been moved in S30 by another certain positioning key 200 in the sewable range 103 as shown in FIG. 10, only the largest frame 110 is determined as usable. Accordingly, only the frame 110 is displayed in the layout screen as shown in FIG. 10.

Until the completion key 109 is depressed, the above-mentioned steps S30 through S32 are repeated while displaying the layout screen. When the operator depresses the completion key 109 (Yes in S28), the display returns to the pattern screen of FIG. 7 in S12. At this point, the operator selects one of the frames 21 that are determined as usable in S31, and sets the selected frame 21 on the bed portion 28 before depressing the sewing start key 26. When the operator depresses the sewing start key 26 (Yes in S16), the CPU 2 produces embroidery data in S18 based on the embroidery data of the selected embroidery pattern retrieved from the ROM 3 or the flash memory 10 and the present position of the embroidery pattern. The CPU 2 records the produced embroidery data in the RAM 4. The embroidery data may also be recorded in the flash memory 10 by the flash memory device 5 when instructed by the operator's manipulation of a record key (not shown). Then, the sewing portion 40 is controlled by the control portion 30 to sew the selected embroidery pattern 102 on the work fabric 22 at the operator's designated position based on the produced embroidery data with the mounted embroidery frame 21.

The frame judging operation in each of the steps S24 and S31 will now be described with reference to FIG. 4.

Figure 4:
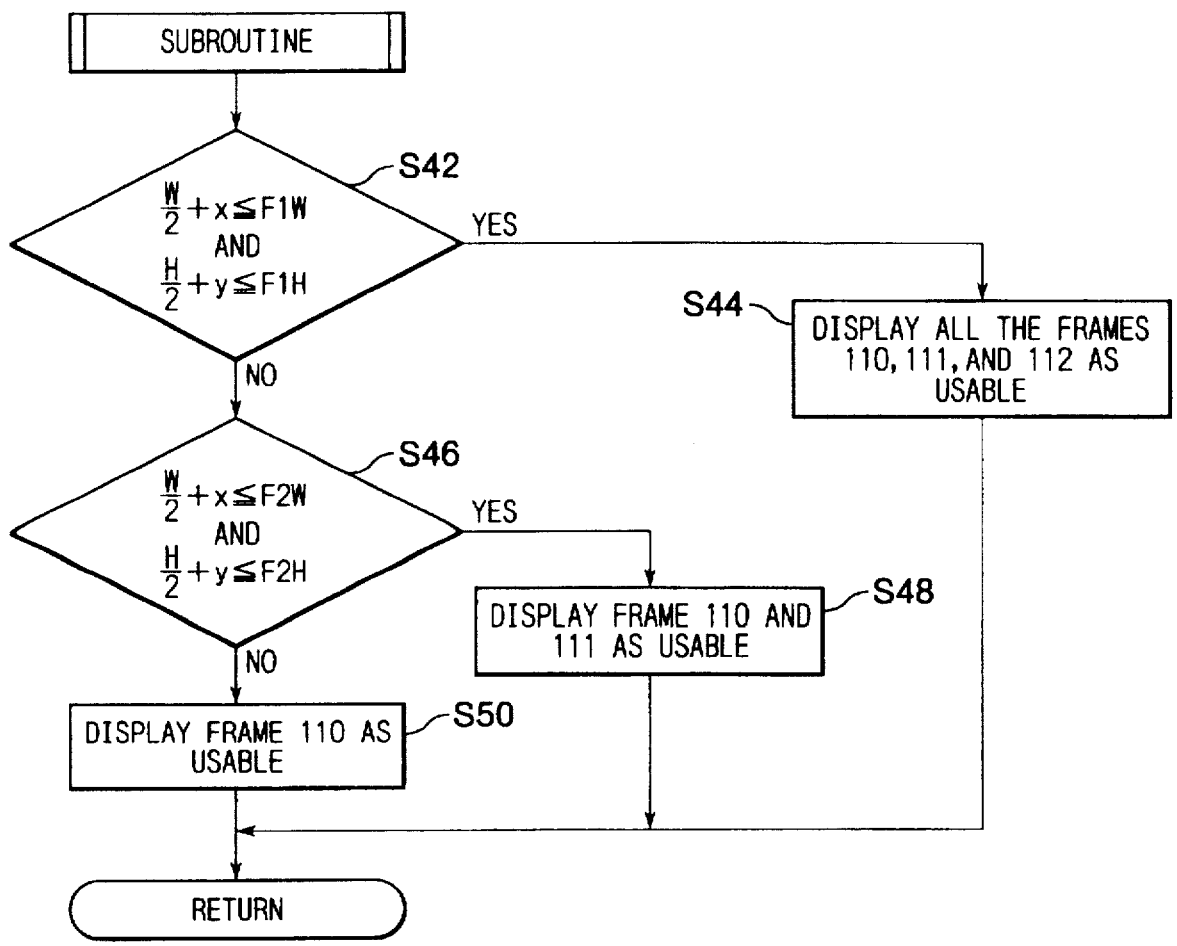
FIG. 4 is a flowchart of a frame judging process performed in the embroidery sewing operation of FIG. 3.

Various reference symbols used in FIG. 4 are defined as follows.

W: Width of the selected embroidery pattern

H: Height of the selected embroidery pattern x: Amount, by which the center of the selected embroidery pattern is displaced in the width direction from the center position of the maximum sewable range 103 according to the manipulation of the positioning keys 200. This value "x" is initially zero before manipulation of the positioning keys 200.

y: Amount, by which the center of the selected embroidery pattern is displaced in the height direction from the center position of the maximum sewable range 103 according to the manipulation of the positioning keys 200. This value "y" is also initially zero before manipulation of the positioning keys 200.

F1W: Size of a sewable region of the smallest embroidery frame 112 in the width direction F1H: Size of a sewable region of the smallest embroidery frame 112 in the height direction F2W: Size of a sewable region of the middle-sized embroidery frame 111 in the width direction F2H: Size of a sewable region of the middle-sized embroidery frame 111 in the height direction F3W: Size of a sewable region of the largest embroidery frame 110 in the width direction F3H: Size of a sewable region of the largest embroidery frame 110 in the height direction As one example in this embodiment, F1W is 30 mm, F1H is 30 mm, F2W is 100 mm, F2H is 100 mm, F3W is 100 mm, and F3H is 200 mm.

In each of the judging operations of S24 and S31, the CPU 2 executes the frame judging program as a sub-routine for the flow chart of FIG. 3. During the sub-routine, as shown in FIG. 4, the CPU 2 judges in S42 whether or not the sum of [a half width "W/2" of the selected embroidery pattern] and [the amount of displacement "x" of the selected embroidery pattern in the width direction from the center of the maximum range 103] is equal to or less than F1W, and whether or not the sum of [a half-height "H/2" of the selected embroidery pattern] and [the amount of displacement "y" of the selected embroidery pattern in the height direction from the center of the maximum range 103] is equal to or less than F1H. When both of the two conditions in S42 are satisfied (Yes in S42), then the selected embroidery pattern, that is presently being positioned as displaced, properly fits within even the smallest embroidery frame 112. Accordingly, all of the embroidery frames 110, 111, and 112 are displayed in S44 as usable frames in the same manner as shown in Fig. B, and the program returns to the main routine shown in Fig. S.

At this point, the CPU 2 may control the LCD 7 to display only the smallest embroidery frame 112 that can be used with the selected embroidery pattern. That is, the CPU 2 may control the LCD 7 not to display all of the embroidery frames that are determined as usable.

On the other hand, when at least one of the two conditions in step S42 is not satisfied (No in S42), then the CPU 2 judges in S46 whether or not the sum of [the half-width "W/2" of the selected embroidery pattern] and [the amount of displacement "x" of the selected embroidery pattern in the width direction from the center of the maximum range 103] is equal to or less than F2W, and whether or not the sum of [the half-height "H/2" of the selected embroidery pattern] and [the amount of displacement "y" of the selected embroidery pattern in the height direction from the center of the maximum range 103] is equal to or less than F2H in S46. When both of the conditions in step S46 are satisfied (Yes in S46.) then it is determined that the selected pattern, that is presently positioned as displaced, can properly fit within the embroidery frames 110 and 111. Accordingly, the CPU 2 controls the LCD 7 to display the embroidery frames 110 and 111 in S48 in the same manner as shown in FIG. 9, and the program returns to the main routine shown in FIG. 3.

When at least one of the conditions in step S46 is not satisfied (No in S46), on the other hand, then the CPU 2 controls the LCD 7 to display only the largest embroidery frame 110 in S50 in the same manner as shown in FIG. 10, and the program returns to the main routine shown in FIG. 3.

It is noted that in this embodiment, the embroidery processing program and various processing data have been prepared in advance so that the sum of [the half-width "W/2" of the selected embroidery pattern] and the [the amount of displacement "x" of the selected embroidery pattern in the width direction from the center of the maximum range 103] will not exceed F3W and so that the sum of [the half-height "H/2" of selected embroidery pattern] and [the amount of displacement "y" of the selected embroidery pattern in the height direction from the center of the maximum range 103] will not exceed F3H.

As described above, according to the present embodiment, a plurality of embroidery patterns are displayed in S8 based on a plurality of sets of embroidery pattern data. A user selects one of the displayed embroidery patterns in S10. The selected embroidery pattern is located at the user's desired position in S30. Next, based on frame data, it is judged in S31 which of several frames is usable with respect to the selected embroidery pattern located at the desired position. The screen displays in E32 only a frame determined as usable for the selected embroidery pattern at the desired position.

While the invention has been described in detail with reference to the specific embodiment thereof, it would be apparent to those skilled in the art that various changes and modifications may be made therein without departing from the spirit of the invention In the above-described frame judging process, embroidery frames, that can be used with respect to the selected embroidery pattern as positioned in the operator's designated position, are determined, and the determined usable frames are displayed in the layout screen of LCD 7. However, the frame judging process can be modified to determine those embroidery frames that cannot be used for the selected pattern located at the operator's designated position. Thus determined unusable frames are erased from the LCD 7, on which all of the embroidery frames have been originally displayed as shown in FIG. 8.

Figure 11:
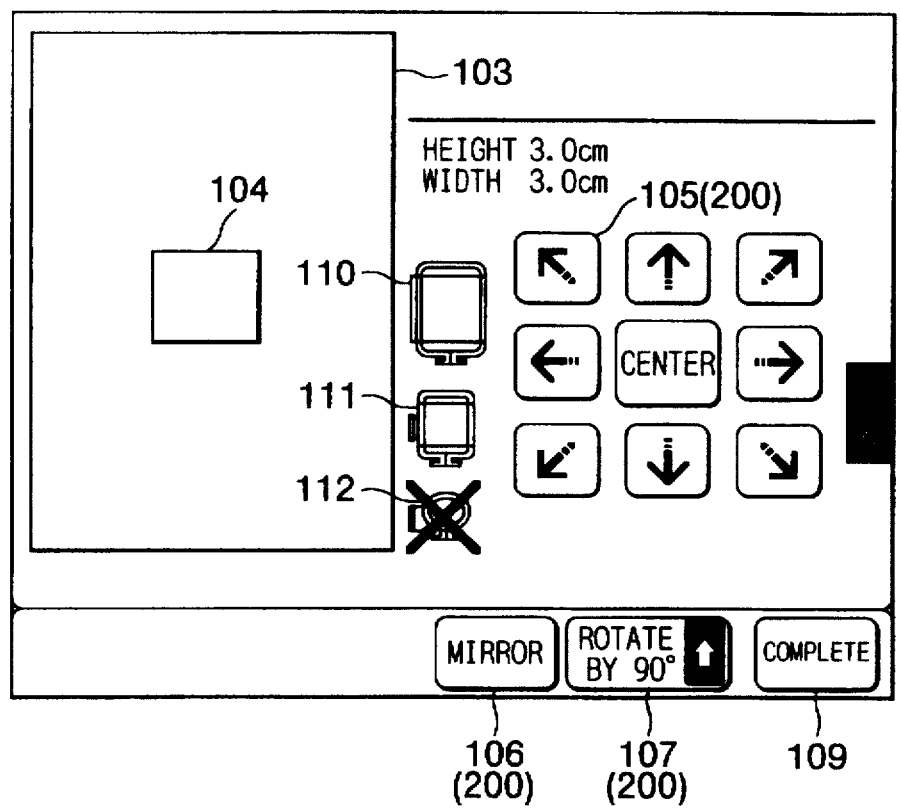
FIG. 11 shows a further example of the layout screen.

Instead of erasing, the frame judging operation may be modified to prohibit the operator from selecting the determined unusable embroidery frames. For example, as shown in FIG. 11, the CPU 2 may control the LCD 7 to cross out those unusable frames with marks "X" to notify the operator that these embroidery frames are unusable. Or, the CPU 2 may control the LCD 7 to show the unusable frames in a half-tone color. Thus, the CPU 2 may control the LCD 7 to display both the usable and unusable frames in a discriminatable manner.

In the above-described embodiment, the different-sized embroidery frames 110, 111, and 112 have different shapes. That is, the shape of the largest embroidery frame 110 is a rectangle, the shape of the medium embroidery frame 111 is a square, and the shape of the smallest embroidery frame 112 is a circle. However, the home embroidery machine 20 can be combined with several embroidery frames which have different sizes but which have similar shapes. When embroidery frames of similar shapes are used with the home embroidery machine 20, it is preferable that the layout screen of FIG. 8 be designed to show a message for indicating the sizes of the respective embroidery frames. Alternatively, the layout screen may be designed to show images of the embroidery frames with their sizes corresponding to the actual sizes. Thus designed layout screen will prevent the operator from misunderstanding the sizes of the frames.

In the above-described embodiment, the images of the embroidery frames are displayed on the layout screen of FIG. 8. However, the names or codes, indicative of the embroidery frames, can be displayed on the layout screen.

In the above-described embodiment, the ROM 3 stores therein bit map data for displaying embroidery patterns on both of the pattern selection screen of FIG. 6 and the selected pattern screen of FIG. 7. The embroidery data of the plurality of embroidery patterns are stored in the ROM 3 and the flash memory 10. However, these data can be stored in other external storage media such as a floppy disk and a ROM card. These data may be retrieved from the external storage media and are displayed on the LCD 7 as required according to commands instructed from the CPU 2 in the same manner as described above.

Similarly, though the program data is stored in the ROM 3 in the above-described embodiment, the program data may be stored in an external storage medium.

The frame judging process of FIG. 4 can be modified as described below.

In general, the area of the work fabric 22 required to be stitched with embroideries Increases as the number of the selected embroidery patterns increases. Accordingly, when the operator selects a large number of patterns, an embroidery frame with a small sewing region will be erased from the layout screen. In view of this, the largest embroidery frame 110 may be designed to receive therein up to three embroidery patterns, the middle-sized embroidery frame 111 may designed to receive therein up to two embroidery patterns, and the smallest embroidery frame 112 may be designed to receive therein only one embroidery pattern. The frame judging process can therefore automatically determine usable frames based on the number of the selected patterns. The frame judging process can be modified to display only the smallest embroidery frame 112 when a single embroidery pattern has been selected. In this case, the larger embroidery frames 110 and 111 can also be used, but are not displayed. Only the middle-sized embroidery frame 111 is displayed when two embroidery patterns have been selected. In this case, the larger embroidery frame 110 can also be used, but is not displayed. Only the largest embroidery frame 110 is displayed when three embroidery patterns have been selected. According to this method, it is possible to display only the smallest embroidery frame that can be used with respect to the selected embroidery pattern.

The above-described embodiment is directed to a sewing machine provided with the sewing portion 40. However, the present invention can be applied to a sewing data processing device not provided with a sewing mechanism.

In the above-described embodiment, all the frames 110–112 are initially displayed on the layout screen in S22. However, the smaller frames 111–112 may not be displayed in S22 according to the selected embroidery pattern.

In the above-described embodiment, the CPU 2 calculates data for displaying the pattern cursor 104 of the selected pattern on the layout screen of FIGS. 8–11 based on the embroidery data, of the selected pattern, retrieved from the ROM 3 or the flash memory 10. That is, the CPU 2 calculates display data of the selected pattern cursor based on sewing data indicative of needle locations for sewing the selected pattern. However, display data of the embroidery pattern cursor 104 may be previously stored as well as embroidery data in the ROM 3 and/or the external storage media such as the flash memory 10. The display data will directly control the LCD 7 to display the selected pattern cursor 104 as shown in FIG. 8. The embroidery data, indicative of needle locations of the selected pattern, will be used only for sewing the selected pattern. Alternatively, the ROM 3 and/or the external storage media may previously store only display data. The CPU 2 may produce embroidery data based on the display data. Or otherwise, the ROM 3 and/or the external storage media may previously store pattern data indicative of a plurality of embroidery patterns. The CPU 2 may produce both embroidery data and display data based on the pattern data.

In the above-described embodiment, the layout screen of FIGS. 8–11 displays the pattern cursor 104 indicative of the maximum outward form of the selected embroidery pattern. However, the layout screen may display the selected embroidery pattern 102. The CPU 2 may produce data for displaying the embroidery pattern 102 based on the embroidery data retrieved from the ROM 3 or the flash memory 10.

In the above-described embodiment, the ROM 3 and/or the external storage media store therein data of a plurality of embroideries to be sewn on the work fabric 22. However, the ROM 3 and/or the external storage media may store a plurality of sets of sewing data of other various sewing patterns such as button hole sewing patterns and pocket sewing patterns. Each set of sewing data includes data indicative of needle locations of a corresponding sewing pattern. The CPU 2 may perform a process similar to the embroidery processing processes of FIGS. 3 and 4 to sew the pattern such as the button hole sewing patterns and the pocket sewing patterns.

As described above, according to the sewing data processing device of the present invention, a plurality of sewing patterns are displayed on a screen based on a plurality of sets of sewing pattern data indicative of shapes of the plurality of sewing patterns. An operator selects one of the displayed plurality of sewing patterns. The operator then designates to locate the selected sewing pattern on his/her desired position. The device judges, based on embroidery frame data, at least one embroidery frame usable for the selected sewing pattern positioned on the designated position. Only the usable embroidery frame is displayed on the screen. It is therefore possible to prevent the operator from selecting an unusable frame. The user can select only the usable frame.

Especially, several embroidery frames are initially displayed on the screen based on several sets of embroidery frame data. When the device judges an embroidery frame unusable for the selected sewing pattern as positioned on the designated position, the unusable embroidery frame is erased from the screen. The operator is therefore prevented from selecting the unusable frame.

The device may judge both an embroidery frame usable for the selected sewing pattern as positioned on the designated position and another embroidery frame unusable for the selected sewing pattern as positioned on the designated position. The operator is informed of both the usable embroidery frame and the unusable embroidery frame. The operator is therefore prevented from selecting the unusable frame.

The operator is reliably prohibited from selecting the unusable embroidery frame. The operator is therefore prevented from selecting the unusable frame.

Both of the selected sewing pattern and the several embroidery frames are displayed on a single screen. Accordingly, the operator can easily grasp which of the frames he/she should select for his/her selected sewing pattern. Especially when the screen displays no usable frames, the operator can immediately know that he/she has to select another sewing pattern which can suitably fit within some frames. It is possible to prevent the operator from continuing to select such a sewing pattern that may not fit within any frames.

The usable embroidery frame is displayed when the selected sewing pattern is designated to be positioned on the operator's desired position. Accordingly, the operator can more accurately grasp a frame which is appropriate for the selected sewing pattern as located at his/her desired position.

What is claimed is:

1. A sewing data processing device, comprising:

sewing pattern display means for displaying a plurality of sewing patterns based on a plurality of sets of sewing pattern data indicative of shapes of the plurality of sewing patterns;

sewing pattern selection means for selecting at least one of the plurality of sewing patterns displayed by the sewing pattern display means;

positioning means for positioning the selected sewing pattern at a desired position;

judging means for judging whether each of several embroidery frames is usable or unusable for the selected sewing pattern positioned at the desired position, the judging means judging each of the several embroidery frames based on embroidery frame data; and output means for outputting the judged result.

2. A sewing data processing device as claimed in claim 1, wherein the judging means judges an embroidery frame usable for the selected sewing pattern positioned at the desired position, the output means including usable frame display means for displaying only an usable embroidery frame.

3. A sewing data processing device as claimed in claim 1, further comprising frame display means for displaying several embroidery frames based on several sets of embroidery frame data.

4. A sewing data processing device as claimed in claim 3, wherein the Judging means judges an embroidery frame unusable for the selected sewing pattern positioned at the desired position, and wherein the output means includes display control means for controlling the frame display means to erase a display of an unusable embroidery frame.

5. A sewing data processing device as claimed in claim 3, wherein the judging means judges both an embroidery frame usable for the selected sewing pattern positioned at the desired position and another embroidery frame unusable for the selected sewing pattern positioned on the desired position, and wherein the output means includes indication means for indicating both an usable embroidery frame and an unusable embroidery frame.

6. A sewing data processing device as claimed in claim 3, wherein the judging means judges an embroidery frame unusable for the selected sewing pattern positioned at the desired position, and wherein the output means includes frame selection prohibiting means for prohibiting an operator from selecting an unusable embroidery frame.

7. A sewing data processing device as claimed in claim 2, wherein the sewing pattern display means and the usable frame display means cooperate to display the selected sewing pattern and the usable embroidery frame on a single screen.

8. A sewing data processing device as claimed in claim 3, wherein the sewing pattern display means and the frame display means cooperate to display the selected sewing pattern and the several embroidery frames on a single screen.

9. A sewing data processing device as claimed in claim 2, wherein the usable frame display means displays the usable embroidery frame when the positioning means positions the selected sewing pattern at the desired position.

10. A sewing data processing device as claimed in claim 3, wherein the frame display means displays the several embroidery frames when the positioning means positions the selected sewing pattern at the desired position.

11. A sewing data processing device, comprising:
 a sewing pattern display displaying a plurality of sewing patterns based on a plurality of sets of sewing pattern data indicative of shapes of the plurality of sewing patterns;
 a sewing pattern selection unit selecting at least one of the plurality of sewing patterns displayed by the sewing pattern display unit;
 a positioning unit positioning the selected sewing pattern at a desired position;
 a judging unit judging whether each of several embroidery frames is usable or unusable for the selected sewing pattern positioned at the desired position, the judging unit judging each of the several embroidery frames based on embroidery frame data; and
 an output unit outputting the judged result.

12. A sewing data processing device as claimed in claim 11, wherein the judging unit judges an embroidery frame usable for the selected sewing pattern positioned at the desired position, the output unit including an usable frame display unit displaying only an usable embroidery frame.

13. A sewing data processing device as claimed in claim 11, further comprising a frame display displaying several embroidery frames based on several sets of embroidery frame data.

14. A sewing data processing device as claimed in claim 13, wherein the judging unit judges an embroidery frame unusable for the selected sewing pattern positioned at the desired position, and wherein the output unit includes a display controller controlling a display of an frame display to erase the unusable embroidery frame.

15. A sewing data processing device as claimed in claim 13, wherein the judging unit judges both an embroidery frame usable for the selected sewing pattern positioned at the desired position and another embroidery frame unusable for the selected sewing pattern positioned at the desired position, and wherein the output unit includes an indication unit indicating both an usable embroidery frame and an unusable embroidery frame.

16. A sewing data processing device as claimed in claim 13, wherein the judging unit judges an embroidery frame unusable for the selected sewing pattern positioned at the desired position, and wherein the output unit includes a frame selection prohibiting unit prohibiting an operator from selecting an unusable embroidery frame.

17. A sewing data processing device as claimed in claim 12, wherein the sewing pattern display and the usable frame display cooperate to display the selected sewing pattern and the usable embroidery frame on a single screen.

18. A sewing data processing device as claimed in claim 13, wherein the sewing pattern display and the frame display cooperate to display the selected sewing pattern and the several embroidery frames on a single screen.

19. A sewing data processing device as claimed in claim 12, wherein the usable frame display displays the usable embroidery frame when the positioning unit positions the selected sewing pattern at the desired position.

20. A sewing data processing device as claimed in claim 13, wherein the frame display displays the several embroidery frames when the positioning unit positions the selected sewing pattern at the desired position.

21. A method of processing sewing data, the method comprising the steps of:
 displaying a plurality of sewing patterns based on a plurality of sets of sewing pattern data indicative of shapes of the plurality of sewing patterns;
 selecting at least one of the displayed plurality of sewing patterns;
 positioning a selected sewing pattern at a desired position;
 judging whether each of several embroidery frames is usable or unusable for the selected sewing pattern positioned at the desired positioning, a judgment being performed based on embroidery frame data; and outputting a judged result.

22. A method as claimed in claim 21, wherein the judging step judges an embroidery frame usable for the selected sewing pattern positioned at the desired position, the outputting step displaying only an usable embroidery frame.

23. A method as claimed in claim 21, further comprising the step of displaying several embroidery frames based on several sets of embroidery frame data.

24. A method as claimed in claim 23, wherein the judging step judges an embroidery frame unusable for the selected sewing pattern positioned at the desired position, and wherein the outputting step erases a display of an unusable embroidery frame.

25. A method as claimed in claim 23, wherein the judging step judges both an embroidery frame usable for the selected sewing pattern positioned at the desired position and another embroidery frame unusable for the selected sewing pattern positioned at the desired position, and wherein the outputting step indicates both an usable embroidery frame and an unusable embroidery frame.

* * * * *

UNITED STATES PATENT AND TRADEMARK OFFICE
CERTIFICATE OF CORRRECTION

PATENT NO. : 5,784,986
DATED : July 28, 1998
INVENTOR(S) : Morita

It is certified that error appears in the above-identified patent and that said Letters Patent is hereby corrected as shown below:

On the title page, item [56] References Cited, insert the following:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | J | P | A | 7 | 36 | 0 | 7 | 1/95 | Japan | | | | |
| | | J | P | A | 11 | 1 | 24 | 69 | 5/96 | Japan | | | | |
| | | | | | | | | | | | | | |

Signed and Sealed this

Fifteenth Day of February, 2000

Attest:

Q. TODD DICKINSON

*Attesting Officer*   *Commissioner of Patents and Trademarks*